F. MORRIS.
PIPE BENDING MACHINE.
APPLICATION FILED DEC. 6, 1916.
1,265,102.
Patented May 7, 1918.
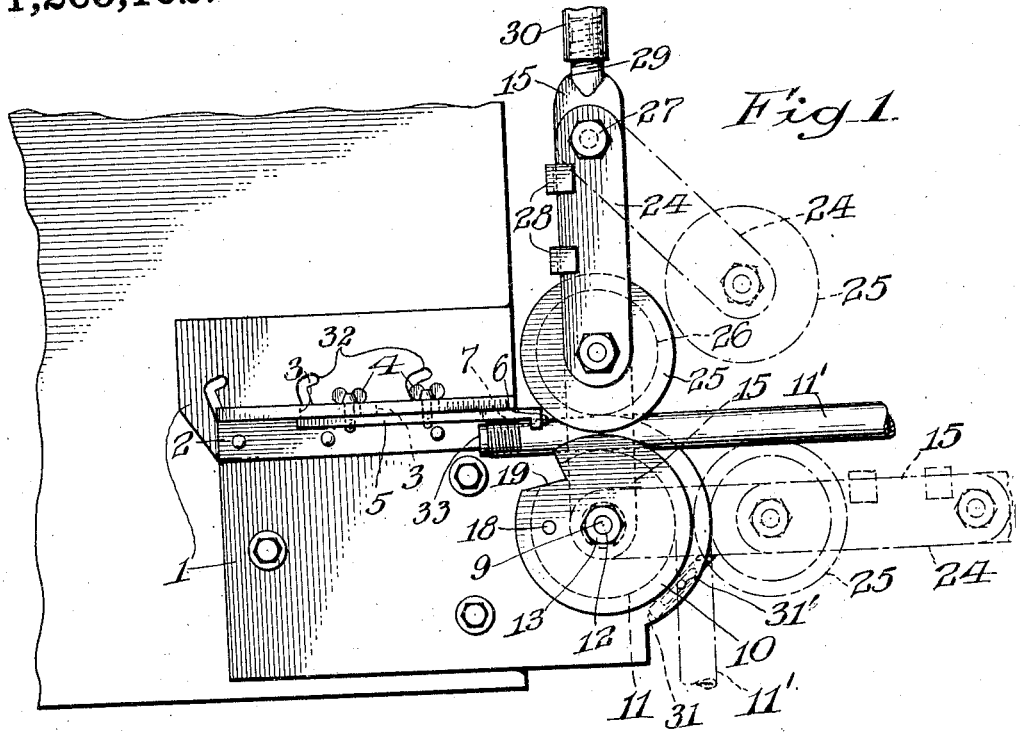
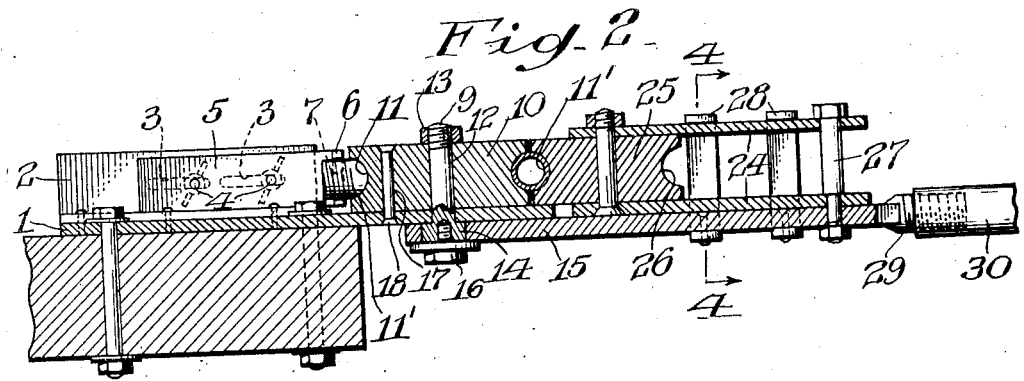
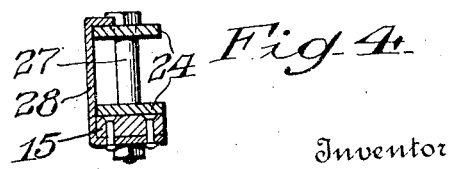
Inventor
Francis Morris,
by J. Stuart Freeman,
Attorney

UNITED STATES PATENT OFFICE.

FRANCIS MORRIS, OF PHILADELPHIA, PENNSYLVANIA.

PIPE-BENDING MACHINE.

1,265,102.

Specification of Letters Patent.　　Patented May 7, 1918.

Application filed December 6, 1916. Serial No. 135,304.

*To all whom it may concern:*

Be it known that I, FRANCIS MORRIS, a citizen of the United States, residing at Philadelphia in the county of Philadelphia and State of Pennsylvania, have invented certain new and useful Improvements in Pipe-Bending Machines of which the following is a specification.

The object of this invention is to provide a device for the purpose of facilitating the rapid and perfect bending of pipe or tubing of various sizes.

Another object is to provide a device of this character which comprises the fewest possible number of parts, and is of the simplest operation.

Still another object is to provide a device which will bend a pipe or tube accurately to a form, such as a peripherally grooved wheel, and without necessitating a great amount of waste material at the beginning of the arc.

And a further object is to provide such a device as will create the bending of a pipe without creasing or cracking any portion of the sides thereof, and which insures the perfect and uniform expansion of the outer circumference and the contraction of the inner circumference of the arc, without mutilation to even a slight degree.

These and other objects of the invention are fully described in the following specification, when read in conjunction with the accompanying drawings in which Figure 1 is a top plan view of the machine in its preferred form and showing the two main operating parts of the device in their extreme relative positions; Fig. 2 is a vertical longitudinal section of the device shown in Fig. 1 with the plate and bar in alinement; Fig. 3 is a detail view of an adapting member for pipes of less size than that which the bending form is designed for; and Fig. 4 is a section on the line 4—4 of Fig. 2.

Referring to the drawings specifically, a plate 1 has adjustably secured thereto an angle iron 2, which is slotted at 3, while adjustably secured to said angle iron with thumb nuts 4 is a stop 5, in turn angularly bent at one end 6 and provided with a concave surface 7 for a purpose hereinafter described.

Removably secured to the end portion of the plate 1 by means of a bolt 9 is a wheel or form 10, provided with a peripheral groove 11 of the same radius as that of the outside diameter of the pipe 11' to be bent. Said bolt comprises a shank 12, threaded and provided with a nut 13 upon one end, while an enlarged head 14 at the other end prevents it from passing upwardly through the plate 1, said head being of slightly greater extent than the thickness of, and acting as a pivotal mounting for, a bar 15 surrounding the same, said head being also provided with a threaded central aperture for the reception of a relatively small bolt 16, for securing the said bar rotatably upon the bolt 9.

The wheel 10 is provided with a hole 17, through which passes a dowel pin 18 into an oppositely positioned hole in the plate 1, said pin preventing the revolving of the said wheel as a section of pipe is being bent. Furthermore, said wheel is angularly recessed at 19, as shown in the drawings, and into this recess extends an inwardly bent flange 20 upon one end of a concavo-convex section of metal 21, formed longitudinally to the same curve as the groove in the wheel 10, the placing of this member within the said wheel operating to alter the latter, to provide for the adaptation of the machine to the bending of a different size of pipe.

Mounted upon the bar 15 is a pair of parallel plates 24 between which is secured a wheel 25, peripherally grooved at 26 to conform to the size of the pipe to be bent, said plates being revoluble about an arc upon said bar and around a bolt 27 as an axis, and positively held against movement in one direction by a pair of stops 28 secured to said bar. The free end portion 29 of the latter is cylindrical and threaded to receive such an article as a length of one-inch pipe 30, used for the purpose of a lever in oscillating the bar 15 about the end of the plate 1.

To bend a piece of pipe, the threaded end of the same is placed against the angular extension of the stop 5 and resting in the groove of the wheel 10, while the wheel 25 also partially encircles the pipe and is as far around in one direction as the bar 15 can be turned, or in other words, in direct alinement between the bolt 27 and the wheel 10. The bar 15 is then turned in a clock-wise direction by means of the lever 30, until it is arrested by an adjustable stop 31, secured by a bolt 31', removably fixed to the underside of the plate 1, upon reaching which point the oscillatable wheel will have bent the pipe through an arc of exactly 90 degrees, and with as small a tangent upon the starting end as may be desired, the threads of said tangent also being well protected against mutilation by the surface 7 of the gage or gripping member 5.

If the stop 31 is removed, the pipe may be bent more than 90 degrees, and, by substituting various sized pairs of wheels for those shown, provision is made for bending several different sizes of pipes, in addition to the added size made possible by using the member 21 with this set. These and other changes may be made in the arrangement of the parts of the invention, without departing from the spirit thereof, or from the scope of the appended claim. Additionally the gage is graduated; the angle iron 2 has its bolts adjustable in slots 32; and a removable plug 33 solidifies the end of the pipe to prevent crushing.

Having thus described my invention, what I claim and desire to protect by Letters Patent of the United States is:—

A tube bending machine, comprising a base plate, provided with parallel slots each having parallel angularly directed offsets; a form secured thereto, a member mounted to oscillate upon said plate with the center of said form as an axis, a yoke pivotally mounted upon said member, a wheel carried by said yoke and adapted to follow the contour of said form upon the oscillation of said first member, an adjustable angle bar provided with means adapted to engage the sides of the said offsets of said slots within said plate to retain said bar in different parallel positions with respect thereto, and a stop carried by said bar and adjustable longitudinally thereof to hold the ends of tubes of various diameters while being bent by said wheel machine, in close proximity to the said angle bar in every position of said angle bar.

In testimony whereof I have affixed my signature.

FRANCIS MORRIS.

Copies of this patent may be obtained for five cents each, by addressing the "Commissioner of Patents, Washington, D. C."